United States Patent [19]

Dewey

[11] Patent Number: 5,347,835
[45] Date of Patent: Sep. 20, 1994

[54] CONTROL LEVER LOCK

[76] Inventor: David L. Dewey, 30412 La Vue, Laguna Niguel, Calif. 92677

[21] Appl. No.: 830,068

[22] Filed: Feb. 3, 1992

[51] Int. Cl.⁵ ............................................. B62H 5/18
[52] U.S. Cl. ........................................ 70/202; 70/211; 70/228; 70/233; 188/24.18; 280/288.4
[58] Field of Search ................ 70/199, 200, 202, 203, 70/233, 211, 212, 228; 188/24.18; 280/288.4

[56] References Cited

U.S. PATENT DOCUMENTS

| | | |
|---|---|---|
| 633,010 | 9/1899 | Josef . |
| 677,907 | 7/1901 | Vandeleur ............................. 70/228 |
| 1,170,099 | 2/1916 | Pawsat . |
| 1,266,391 | 5/1918 | Bonney ............................. 70/203 X |
| 1,274,427 | 8/1918 | Landmann ......................... 70/200 |
| 1,285,827 | 11/1918 | Staack ................................ 70/203 X |
| 1,350,316 | 8/1920 | Kemmling ......................... 70/203 |
| 1,579,395 | 4/1926 | Rohm et al. ...................... 70/199 |
| 2,082,248 | 6/1937 | Karpel ................................ 208/79 |
| 2,579,798 | 12/1951 | Crabbs ............................... 70/203 |
| 2,776,579 | 1/1957 | Nichel ................................ 74/488 |
| 3,624,945 | 12/1971 | Foote ................................. 70/202 X |
| 4,133,193 | 1/1979 | Sanada et al. .................... 70/183 |
| 4,298,211 | 11/1981 | Shitamori ......................... 280/297 |
| 4,426,861 | 1/1984 | Chillis ................................ 70/203 X |
| 4,444,407 | 4/1984 | Calmonte et al. ............... 280/297 |
| 4,725,075 | 2/1988 | Biancardi ....................... 280/763.1 |
| 4,779,435 | 10/1988 | Farrow .............................. 70/200 X |
| 5,042,754 | 8/1991 | Heath ................................. 70/211 X |
| 5,052,202 | 10/1991 | Murphy .............................. 70/211 |

FOREIGN PATENT DOCUMENTS

| | | |
|---|---|---|
| 12756 | 6/1896 | United Kingdom ................ 70/228 |
| 0199775 | 7/1923 | United Kingdom . |
| 454672 | 10/1936 | United Kingdom ........ 70/DIG. 58 |

Primary Examiner—Lloyd A. Gall
Attorney, Agent, or Firm—Macro Search Corp.

[57] ABSTRACT

A device is provided for locking a control lever on a handlebar of a cycle. A first clamp arm has a key-actuated lock with a lock mechanism extending therefrom. A second clamp arm has a lock engagement recess for accepting the lock mechanism of the lock therein. The two clamp arms may be locked together as a single unit, a first opening therein for enclosing a portion of the handlebar, and a second opening therein for enclosing a portion of the control lever. The first opening further includes a plurality of protruding tits extending therefrom for frictional engagement with the handlebar to prevent the arms from rotating on the handlebar. In use, the arms are separately placed over the portion of the handlebar and the control lever and then joined and locked together thereon to prevent the use of the control lever.

6 Claims, 5 Drawing Sheets

CONTROL LEVER LOCK

FIELD OF THE INVENTION

This invention relates generally to locking devices, and, more particularly, to a device for locking a control lever of a vehicle.

BACKGROUND OF THE INVENTION

Motorcycle and all-terrain vehicle (ATV) owners frequently must use an auxiliary locking device to protect their vehicle from theft or unauthorized use. Significant drawbacks are often associated with such auxiliary locking devices. For example, a U-shaped hardened steel rod with a locking cross-bar, typically secured around a wheel or suspension member, is cumbersome to carry and install. Moreover, such a locking device must be fastened to the vehicle in a location that is typically dirty, or near extremely hot engine elements. Further, such a locking device, when in use, is easy to overlook as it is usually not secured to the vehicle in a prominent and visible location. Such an oversight might lead a person to attempt to use the vehicle while such a locking device is in place, possibly damaging the vehicle and injuring the operator. Similar drawbacks exist with other types of locking devices, such a chain and padlock device, a flexible link-type lock, a coiled cable and padlock device, and the like. Moreover, such locking devices are typically not well-suited for ATVs, which generally have solid wheel rims and do not provide a suitable location to secure such a locking device.

Other types of locking devices exist for motorcycles and ATVs. For example, a throttle grip locking device disclosed in U.S. Pat. No. 4,133,193 to Sanada et al., issued on Jan. 9, 1979, illustrates a key-actuated lock for a throttle control. A significant problem with this type of locking device is that it is not readily attached or removed from the vehicle. Installation of such a device is considerably expensive since a new throttle control, with this type of locking device built therein, must be installed in place of the original throttle control.

Another example of a common type of cycle locking device is disclosed in U.S. Pat. No. 2,082,248, issued to Karpel on Jun. 1, 1937. This type of locking device generally integrates a locking means with a kick-stand, the locking means locking the kick-stand in an extended position and thereby preventing use of the cycle. Such a device, however, is not readily accessible to the cycle operator, and often becomes quite dirty over a period of time due to its proximity to the ground and a generally dirty environment. Moreover, such a device is not readily attached or removed, and is not well-suited for ATVs.

Clearly, then, there is a need for a locking device that is readily installed and removed on motorcycles, ATVs, and vehicles with similar control elements. Such a needed device would be highly visible, thereby further deterring theft or unauthorized use. Moreover, such a needed device would be readily installed from a seated position, and not require the vehicle operator to hunch down in an awkward position to use the device. Such a needed device would not require the operator to position his hands near hot engine elements, or dirty or greasy vehicle parts. Further, such a needed device would be small, light-weight, easily carried and stored. The present invention fulfills these needs and provides further related advantages.

SUMMARY OF THE INVENTION

The present invention is a device for locking a control lever on a handlebar of a cycle. A first clamp arm has a locking means with a lock mechanism extending therefrom. A second clamp arm has a lock engagement means for accepting the lock mechanism of the locking means therein. The two clamp arms may be locked together as a single unit, a first opening therein for enclosing a portion of the handlebar, and a second opening therein for enclosing a portion of the control lever. Preferably, the second opening is wedge shaped so as to accept entrance of a control lever from a wide range of angles. Alternately, an adjustable positioning block is adjustably attached within the second opening for adaptation of the second opening to the control lever so as to hold the control lever snugly within the second opening. The positioning block might further be pivotally attached within the second opening to allow more ready adaptation to the control lever. The first opening further includes a plurality of protruding tits extending therefrom for frictional engagement with the handlebar to prevent the arms from rotating on the handlebar.

In operation, the first and second clamp arms are separately placed over the portion of the handlebar and the control lever, and then joined and locked together thereon, thereby preventing the use of the control lever.

The present invention is easily installed in a safe, clean, and readily accessible location on both motorcycles, bicycles, and many three and four wheeled ATVs. Moreover, the present invention is plainly visible while in use, thereby further deterring would-be thiefs. Further, the device can be used to lock both clutch or brake control levers, and prevent the use of the throttle control. Still further, the present invention is light-weight and easily ported and stored. Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
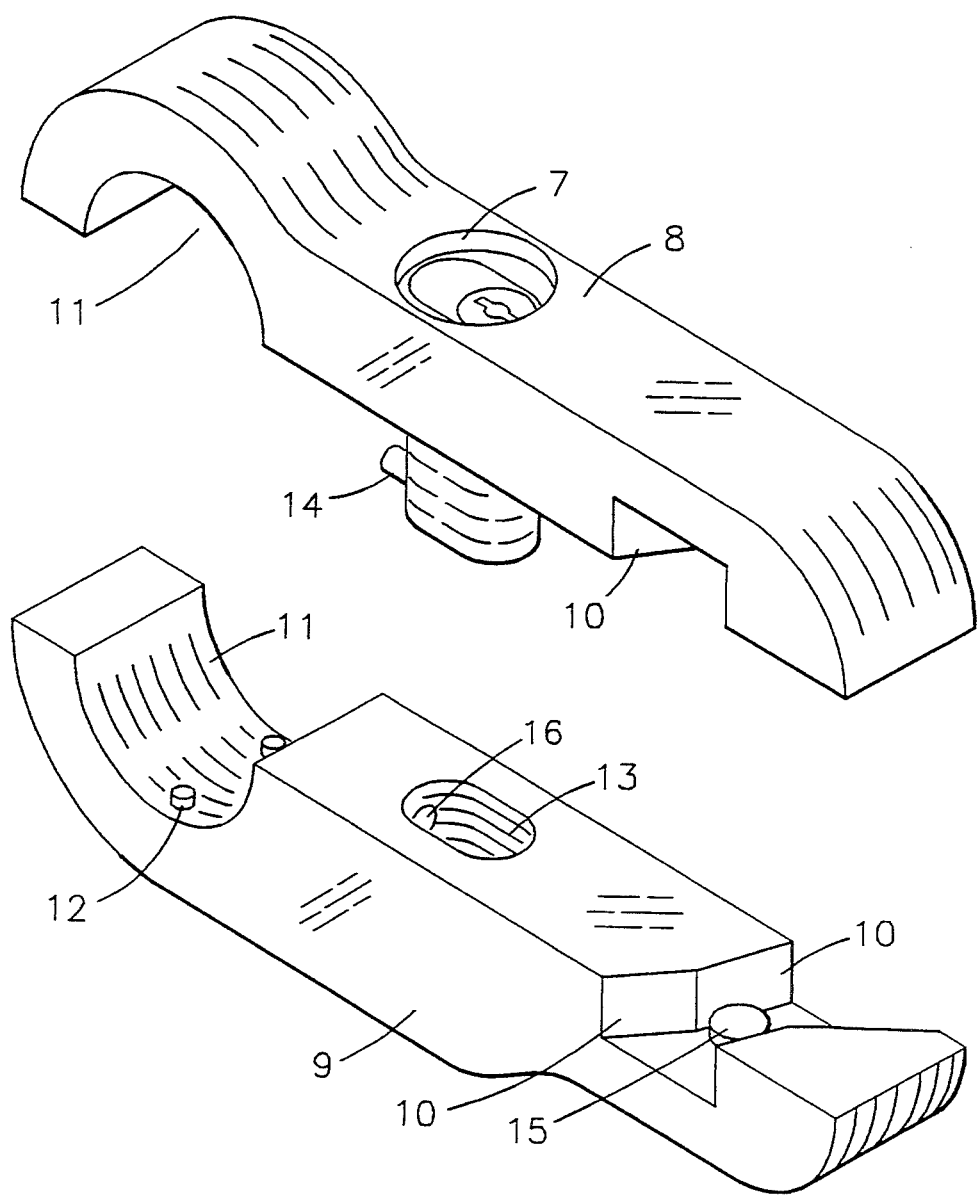
FIG. 1 is an exploded perspective illustration of the invention, illustrating a first clamp arm and a second clamp arm.
Figure 2:
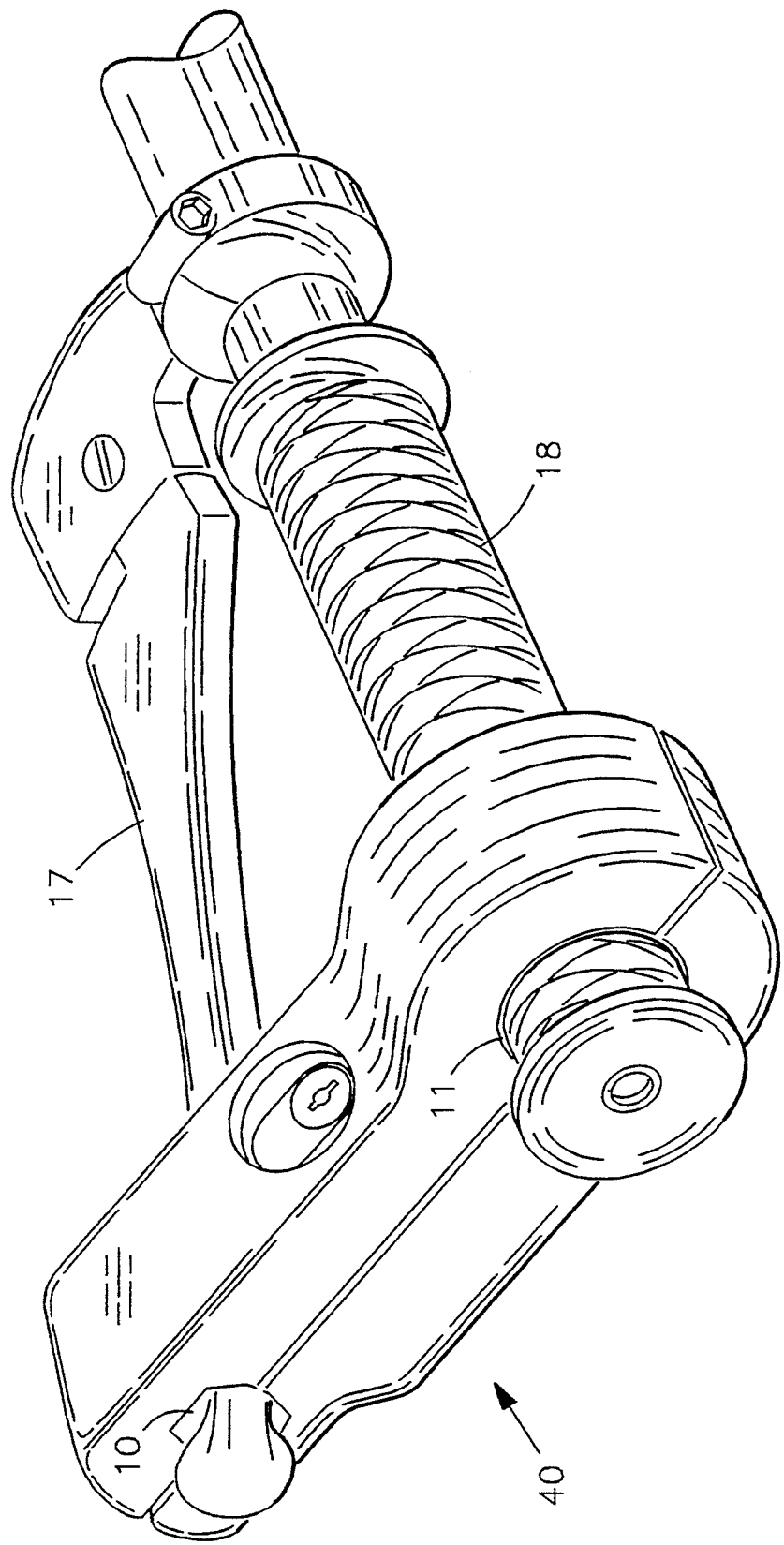
FIG. 2 is a perspective illustration of the invention as used on a handlebar of a cycle, illustrating a single unit formed by locking the first and second clamp arms together around a control lever and the handlebar.
Figure 3:
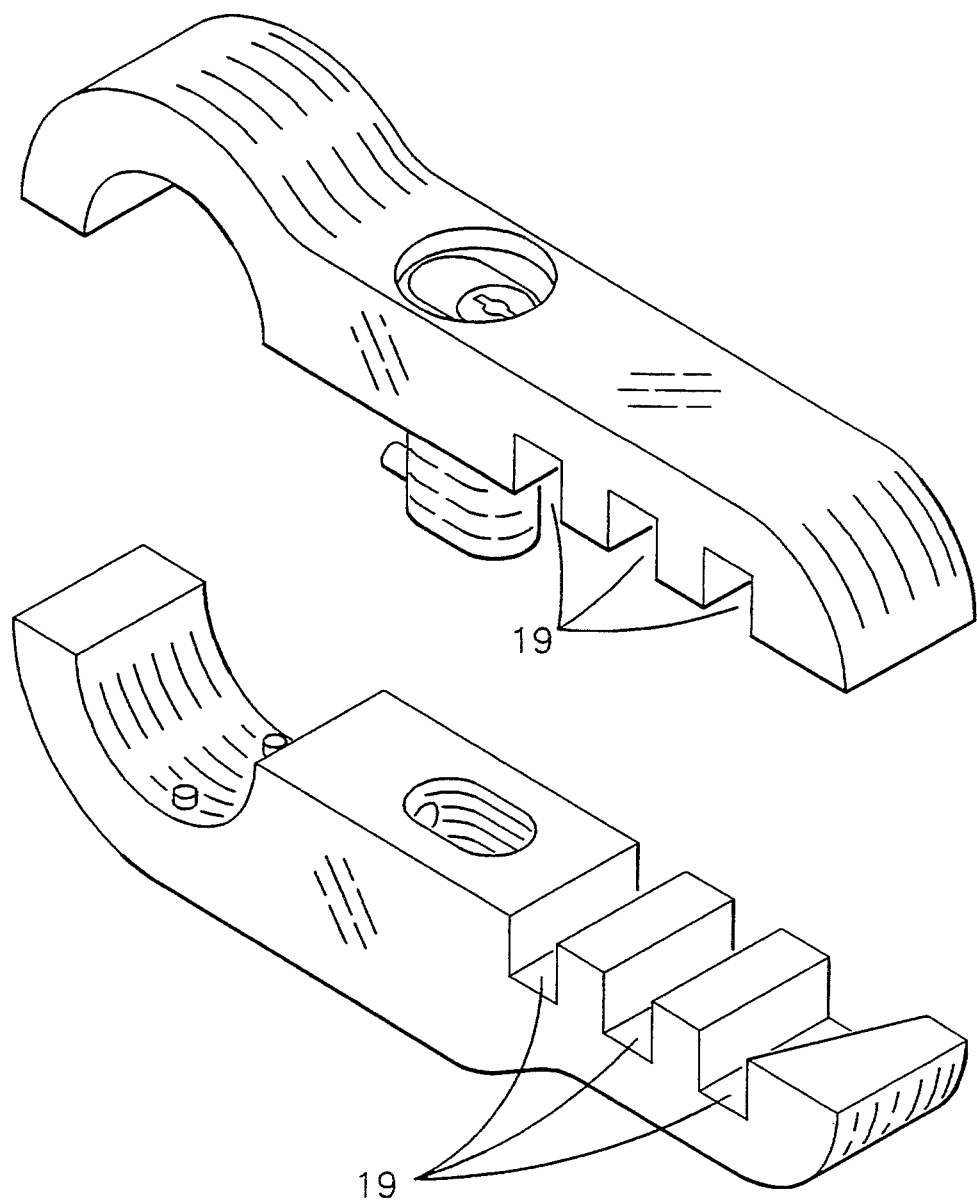
FIG. 3 is an exploded perspective illustration of an alternate embodiment of the invention, illustrating a plurality of second openings in the clamp arms.

FIGS. 1 and 2 show a device for locking a control lever 17 on a handlebar 18 of a cycle or all-terrain vehicle. A first clamp arm 8 has a locking means 7 with a lock mechanism 14 extending therefrom. A second clamp arm 9 has a lock engagement means 13 with a lock mechanism engagement means 16 for accepting the lock mechanism 14 of the locking means 7 therein. The two clamp arms 8,9 may be locked together as a single unit 40 (FIG. 2), defining a first opening 11 therein for enclosing a portion of the handlebar 18, and a second opening 10 therein for enclosing a portion of the control lever 17. In an alternate embodiment of the invention, the clamp arms 8,9 include a plurality of second openings 19 (FIG. 3), the user selecting a suitable opening 19 for enclosing a portion of the control lever 17. In the preferred embodiment of the invention, the arms 8,9 are normal to the axis of the handlebar 18 when the arms 8,9 are locked therearound. Preferably, the clamp arms 8,9 are manufactured from a strong, rigid metal material, such as a hardened steel or aluminum alloy. However, any suitably strong and rigid material may be used as long as such material can resist forceful attempts to separate or fracture the arms 8,9.

Figure 6:
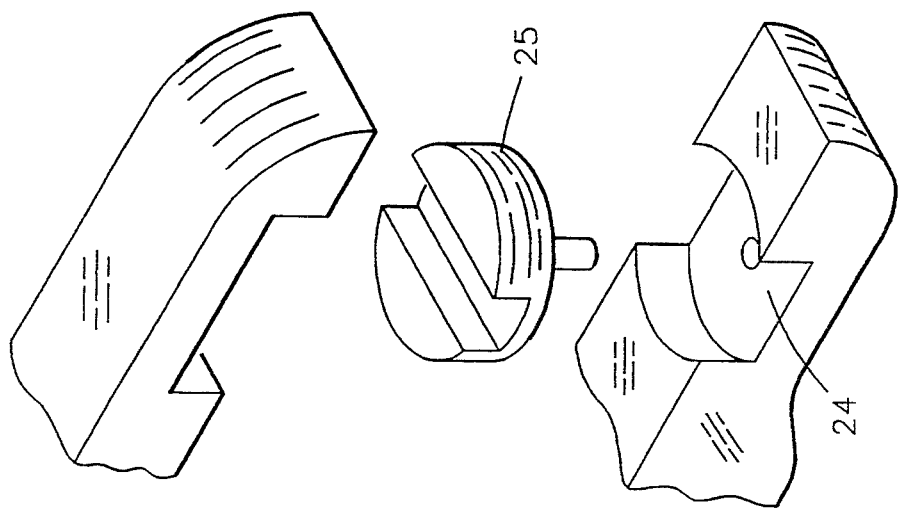
FIG. 6 is a partial exploded perspective illustration of an alternate embodiment of the invention, illustrating an alternate pivotable positioning block of the second opening.
Figure 5:
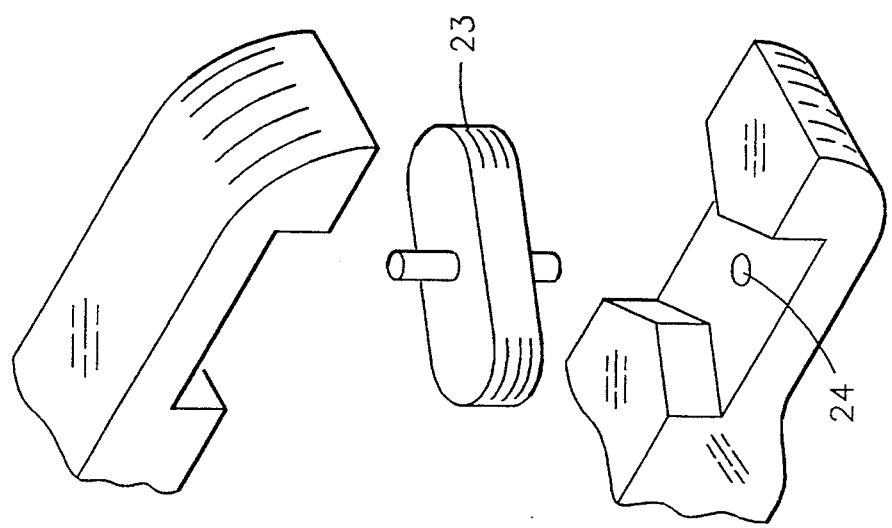
FIG. 5 is a partial exploded perspective illustration of an alternate embodiment of the invention, illustrating a pivotable, adjustable positioning block of the second opening.
Figure 4:
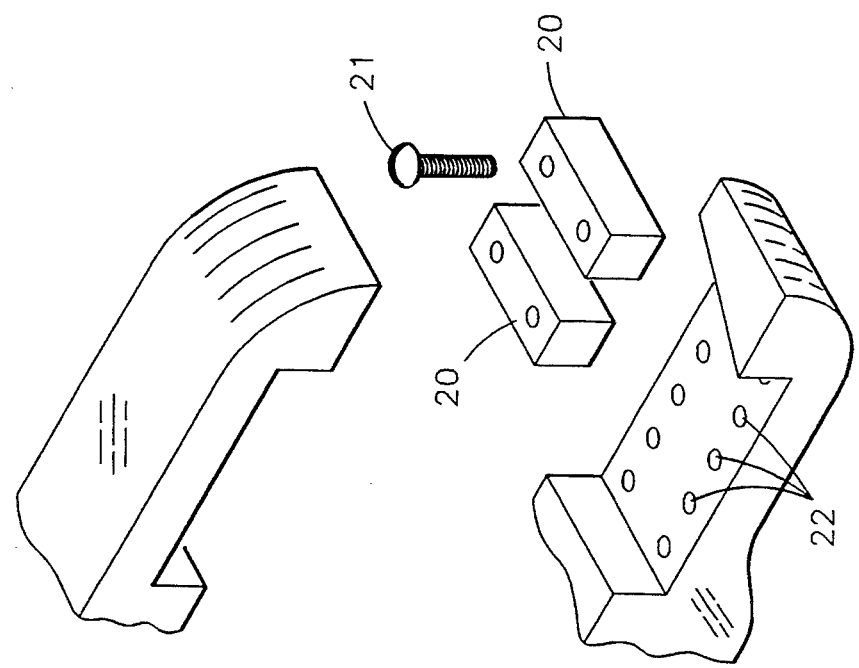
FIG. 4 is a partial exploded perspective illustration of an alternate embodiment of the invention, illustrating adjustable positioning blocks of the second opening.

Preferably, the second opening 10 is wedge shaped (FIG. 1) so as to accept entrance of a control lever from a wide range of angles. In an alternate embodiment (FIG. 4) of the invention, a plurality of adjustable positioning blocks 20 are each adjustably attached within the second opening 10 with mounting screws 21 into tapped holes 22 for adaptation of the second opening 10 to the control lever 17 so as to hold the control lever 17 snugly within the second opening 10 and to accommodate a wide variety of sizes of control levers 17. In an alternate embodiment (FIG. 5) of the invention, a rotatable positioning block 23 might further be pivotally attached at a pivot hole 24 within the second opening 10 to allow quick adaptation of the second opening 10 to various sizes and shapes of the control lever 17. In yet another embodiment (FIG. 6) of the invention, a slotted positioning block 25 is pivotally attached at the pivot hole 24 within the second opening 10, the positioning block 25 and the second opening 10 both taking a generally circular shape. Clearly, positioning blocks 20,23,25 are all manufactured from a suitably strong metal or plastic material.

The first opening 11 may further include a plurality of protruding tits 12 extending therefrom for frictional engagement with the handlebar 18 to prevent the single unit 40 from rotating on the handlebar 18. Further, protruding cushions 15 (FIG. 1) may be placed so as to extend into the second opening 10. Cushions 15 are preferably manufactured from a resilient rubber, plastic, foam material, or other compliant material, and ensure that the control lever 17 is held snugly within the second opening 10.

Figure 7:
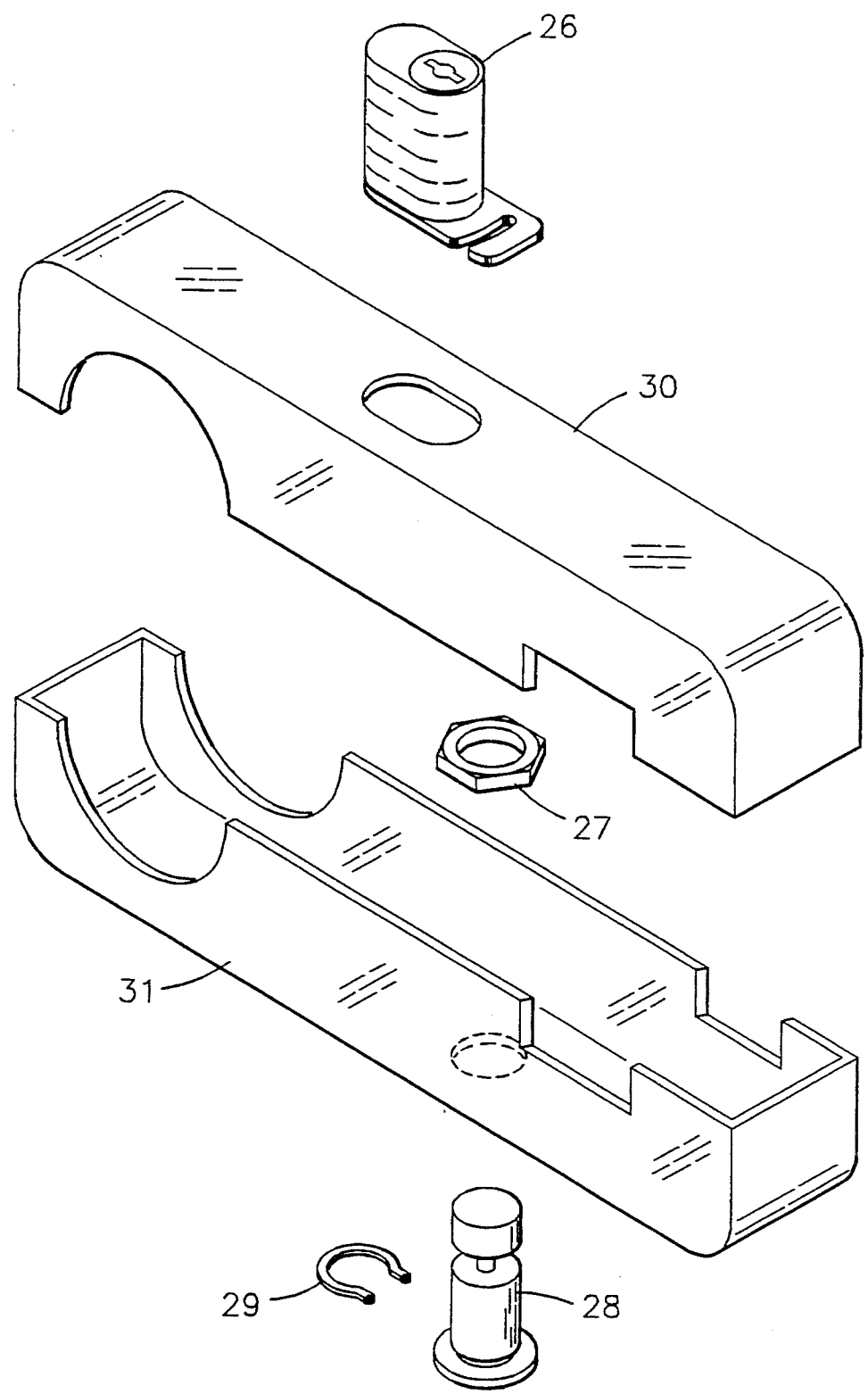
FIG. 7 is an exploded perspective illustration of an alternate embodiment of the invention, illustrating the components of an alternate locking mechanism.

The means for locking 7, in the preferred embodiment of the invention, is a key actuated bolt-and-tumbler type locking mechanism (FIG. 1). However, alternate suitable locking means may be used as long as the lock means 7 is of sufficient strength to resist unauthorized attempts to disengage the invention from the handlebar 18. One such alternate locking means 7 is illustrated in FIG. 7. A key-actuated tumbler 26 is fixed to a formed sheet metal first clamp arm 30 with a threaded nut 27. A notched pin 28 is fixed to a formed sheet metal second clamp arm 31 with a spring washer 29. The first clamp arm 30 is locked to the second clamp arm 31 when the key actuated tumbler 26 engages the notched pin 28.

In operation, the first and second clamp arms 8,9 are separately placed over the portion of the handlebar 18 and the control lever 17, and then joined and locked together thereon, thereby preventing the use of the control lever 17. If the handlebar 18 further includes a throttle control (not shown), the first opening 11 of the present invention may be locked therearound, further preventing the use of the throttle control.

While the invention has been described with reference to a preferred embodiment, it is to be clearly understood by those skilled in the art that the invention is not limited thereto. Rather, the scope of the invention is to be interpreted only in conjunction with the appended claims.

I claim:

1. A device for locking a control lever on a handlebar of a cycle, comprising:

a first clamp arm and a second clamp arm, said arms being separable one from the other, and a means for locking, the locking means being fixedly mounted within the first clamp arm and having a lock mechanism extending therefrom, the second clamp arm having lock engagement means for accepting the lock mechanism of the locking means therein, such that the clamp arms may be locked together as a single unit defining a first opening therein for enclosing a portion of the handlebar, and a plurality of second openings therein for enclosing a portion of the control lever in any one of said second openings such that the arms may be separately placed over the portion of the handlebar and the control lever and then joined and locked together thereon to prevent the use of the control lever.

2. The device of claim 1 wherein at least one of the plurality of second openings is wedge shaped, said wedge shape lying in the plane of motion of the control lever such that the opening accepts entrance of the control lever from a wide range of angles of the control lever with respect to the handlebar.

3. The device of claim 1 further including a plurality of protruding tits extending from at least one of the arms within the first opening for frictional engagement with the handlebar to prevent the arms from rotating on the handlebar.

4. A device for locking a control lever on a handlebar of a cycle, comprising:

a first clamp arm and a second clamp arm, said arms being separable one from the other, and a means for locking, the locking means being fixedly mounted within the first clamp arm and having a lock mechanism extending therefrom, the second clamp arm having lock engagement means for accepting the lock mechanism of the locking means therein, such that the clamp arms may be locked together as a single unit defining a first opening therein for enclosing a portion of the handlebar, and at least one second opening therein including a series of threaded screw holes, each for receiving a screw and at least one positioning block, said block having at least one clearance hole therein for receiving said screw for attachment of said block to said second clamp arm, the position of the block being selectable to accommodate the control lever over a range of positions, for enclosing a portion of the control lever such that the arms may be separately placed over the portion of the handlebar and the control lever and then joined and locked together thereon to prevent the use of the control lever and such that the control lever is held snugly within the second opening.

5. A device for locking a control lever on a handlebar of a cycle, comprising:

a first clamp arm and a second clamp arm, said arms being separable one from the other, and a means for locking, the locking means being fixedly mounted within the first clamp arm and having a lock mechanism extending therefrom, the second clamp arm having lock engagement means for accepting the lock mechanism of the locking means therein, such that the clamp arms may be locked together as a single unit defining a first opening therein for enclosing a portion of the handlebar, and at least one second opening therein including one elongated positioning block, pivotally mounted at the center of said opening to form a channel between the block and each sidewall of said opening, such that the block pivots in the plane of motion of the control lever to accept the control lever at an angle within the range of pivotal accommodation of the block, for enclosing a portion of the control lever such that the arms may be separately placed over the portion of the handlebar and the control lever and then joined and locked together thereon to prevent the use of the control lever.

6. A device for locking a control lever on a handlebar of a cycle, comprising:

a first clamp arm and a second clamp arm, said arms being separable one from the other, and a means for locking, the locking means being fixedly mounted within the first clamp arm and having a lock mechanism extending therefrom, the second clamp arm having lock engagement means for accepting the lock mechanism of the locking means therein, such that the clamp arms may be locked together as a single unit defining a first opening therein for enclosing a portion of the handlebar, and at least one second opening therein including a disk shaped positioning block, pivotally mounted at the center of said second opening, the disk providing a channel therein, such that the disk may be rotated within the second opening to accept the control lever at any angle within the range of pivotal accommodation of the block, for enclosing a portion of the control lever such that the arms may be separately placed over the portion of the handlebar and the control lever and then joined and locked together thereon to prevent the use of the control lever.

* * * * *